(12) United States Patent
Kallin et al.

(10) Patent No.: US 6,645,103 B2
(45) Date of Patent: Nov. 11, 2003

(54) BELT APPARATUS FOR USE IN A DOCUMENT PROCESSING SYSTEM

(75) Inventors: Fredrik L. N. Kallin, Waterloo (CA); Svetozar Doroslovac, Waterloo (CA)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/004,134

(22) Filed: Oct. 23, 2001

(65) Prior Publication Data

US 2003/0078123 A1 Apr. 24, 2003

(51) Int. Cl.[7] .................................................. F16H 7/00
(52) U.S. Cl. ........................................ 474/148; 474/150
(58) Field of Search ................................ 474/101, 114, 474/115, 116, 117, 148, 149, 150

(56) References Cited

U.S. PATENT DOCUMENTS

| | | | | |
|---|---|---|---|---|
| 4,404,649 A | * | 9/1983 | Nunley et al. | 235/379 |
| 4,730,448 A | * | 3/1988 | Wolf et al. | 57/105 |
| 5,240,461 A | * | 8/1993 | Hohnl | 474/101 |
| 5,374,222 A | * | 12/1994 | Hoffman et al. | 474/150 |
| 5,669,212 A | * | 9/1997 | Bening et al. | 56/13.3 |
| 5,890,710 A | * | 4/1999 | Phillips et al. | 271/124 |

* cited by examiner

Primary Examiner—Thomas R. Hannon
Assistant Examiner—Vicky A. Johnson
(74) Attorney, Agent, or Firm—Michael Chan

(57) ABSTRACT

A belt apparatus is provided for use in a document processing system having a baseplate, a removable bearing assembly connected to the baseplate and having a drive pulley to which a drive belt is drivingly coupled. The belt apparatus comprises a bracket coupled to the baseplate and for supporting the drive belt when the bearing assembly including the drive pulley is removed from the baseplate. The bracket supports the drive belt below the baseplate to allow the drive belt and the drive pulley of a replacement bearing assembly to be easily coupled together without having to lift the baseplate to gain access to the space below the baseplate. Preferably, the bracket comprises a substantially U-shaped bracket. The bracket may include a pair of flanges on which the drive belt rests when the bearing assembly is removed from the baseplate. The pair of flanges extend in substantially opposite directions relative to each other and substantially parallel with the plane in which the baseplate lies. The bracket supports the drive belt below the baseplate to allow the drive belt and the drive pulley of a replacement bearing assembly to be easily coupled together when the bearing assembly is removed from the baseplate and replaced with the replacement bearing assembly. The belt apparatus may include a belt tensioner mechanism for enabling the tension of the drive belt to be adjusted after the drive belt and the drive pulley of the replacement bearing assembly have been coupled together. The belt tensioner mechanism may include a torsion spring for enabling correct tension to be applied to the drive belt. The belt tensioner mechanism may include a belt tensioner handle accessible from above the baseplate for, when operated by a field-service operator, releasing tension from the drive belt to allow the bearing assembly to be more easily removed from the baseplate.

2 Claims, 5 Drawing Sheets

BELT APPARATUS FOR USE IN A DOCUMENT PROCESSING SYSTEM

BACKGROUND OF THE INVENTION

The present invention relates to document processing systems, and is particularly directed to a belt apparatus for use in a document processing system, such as an image-based check processing system.

A typical image-based check processing system includes a check processing transport which has a document track and a number of check processing modules positioned along the document track for performing specific document processing operations on document items including checks moving downstream along the document track. The check processing system also includes a transport processor which executes a transport application program which is stored in memory to control operation of the check processing modules positioned along the document track and thereby to control operation of the check processing transport.

More specifically, the check processing transport includes a hopper module into which a stack of document items including checks are placed. A document feeder module adjacent the hopper module selectively feeds or drives each document item from the stack of document items in the hopper module to transport the document item from the upstream end to the downstream end along the document track to sorting pockets of a pocket module located at the end of the document track. The pockets receive document items which have been sorted in accordance with the transport application program.

Each check processing module typically includes a number of bearing assemblies. Each bearing assembly includes a drive pulley, a bearing housing, and a drive shaft rotatably supported by the bearing housing and having one end connected to the drive pulley. The other end of the drive shaft is connectable to a drive wheel for engaging document items to move the document items. A drive belt is drivingly coupled to the drive pulley. The drive pulley and the drive belt are located below a baseplate of the check processing module. During operation of the check processing module, bearings contained within the bearing housing become worn due to frictional wear. Eventually, the bearing assembly including the bearings, the bearing housing, the drive shaft, and the drive pulley needs to be removed and replaced with a new bearing assembly.

Presently, when a bearing assembly is worn and needs to be replaced, a field-service operator disassembles some hardware parts on the check processing module so that the baseplate can be lifted and pivoted about a hinging mechanism in order to gain access to the space below the baseplate. Access to the space below the baseplate is needed because, after the worn bearing assembly is replaced with a new bearing assembly, the field-service operator needs to couple the drive belt to the drive pulley of the new bearing assembly. The amount of work required to replace the worn bearing assembly with the new bearing assembly is usually quite extensive. It would be desirable to minimize the amount of work required to replace the worn bearing assembly with the new bearing assembly.

SUMMARY OF THE INVENTION

In accordance with one aspect of the present invention, a belt apparatus is provided for use in a document processing system having a baseplate, a removable bearing assembly connected to the baseplate and having a drive pulley to which a drive belt is drivingly coupled. The belt apparatus comprises a bracket coupled to the baseplate and for supporting the drive belt when the bearing assembly including the drive pulley is removed from the baseplate. The bracket supports the drive belt below the baseplate to allow the drive belt and the drive pulley of a replacement bearing assembly to be easily coupled together without having to lift the baseplate to gain access to the space below the baseplate.

Preferably, the bracket comprises a substantially U-shaped bracket. The bracket may include a pair of flanges on which the drive belt rests when the bearing assembly is removed from the baseplate. The pair of flanges extend in substantially opposite directions relative to each other and substantially parallel with the plane in which the baseplate lies. The bracket supports the drive belt below the baseplate to allow the drive belt and the drive pulley of a replacement bearing assembly to be easily coupled together when the bearing assembly is removed from the baseplate and replaced with the replacement bearing assembly. The belt apparatus may include a belt tensioner mechanism for enabling the tension of the drive belt to be adjusted after the drive belt and the drive pulley of the replacement bearing assembly have been coupled together. The belt tensioner mechanism may include a torsion spring for enabling correct tension to be applied to the drive belt. The belt tensioner mechanism may include a belt tensioner handle accessible from above the baseplate for, when operated by a field-service operator, releasing tension from the drive belt to allow the bearing assembly to be more easily removed from the baseplate.

In accordance with another aspect of the present invention, a belt apparatus is provided for use in a document processing system having a baseplate, a removable bearing assembly connected to the baseplate, and a drive belt drivingly coupled to the bearing assembly. The belt apparatus comprises means for supporting the drive belt when the bearing assembly is removed from the baseplate, and means for adjusting tension in the drive belt after the drive belt and a replacement bearing assembly have been coupled together.

Preferably, the supporting means comprises a substantially U-shaped bracket. The bracket supports the drive belt below the baseplate to allow the drive belt and a replacement bearing assembly to be easily coupled together without having to lift the baseplate to gain access to the space below the baseplate. The bracket may include a pair of flanges on which the drive belt rests when the bearing assembly is removed from the baseplate. The pair of flanges extend in substantially opposite directions relative to each other and substantially parallel with the plane in which the baseplate lies. The supporting means supports the drive belt below the baseplate to allow the drive belt and a replacement bearing assembly to be easily coupled together when the bearing assembly is removed from the baseplate and replaced with the replacement bearing assembly. The adjusting means may include a belt tensioner mechanism for enabling the tension of the drive belt to be adjusted after the drive belt and the replacement bearing assembly have been coupled together. The belt tensioner mechanism may include a torsion spring for enabling correct tension to be applied to the drive belt. The belt tensioner mechanism may include a belt tensioner handle accessible from above the baseplate for, when operated by a field-service operator, releasing tension from the drive belt to allow the bearing assembly to be more easily removed from the baseplate.

In accordance with yet another aspect of the present invention, a method of servicing a document processing system having a baseplate, a removable bearing assembly connected to the baseplate, and a drive belt drivingly coupled to the bearing assembly comprises the steps of supporting the drive belt below the baseplate to allow the drive belt and a replacement bearing assembly to be easily coupled together when the bearing assembly is removed and replaced with the replacement bearing assembly, and adjusting tension in the drive belt after the drive belt and the replacement bearing assembly have been drivingly coupled together. The method may further comprise the step of removing the bearing assembly connected to the baseplate without having to lift the baseplate to gain access to the space below the baseplate.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILS OF THE INVENTION

Figure 1:
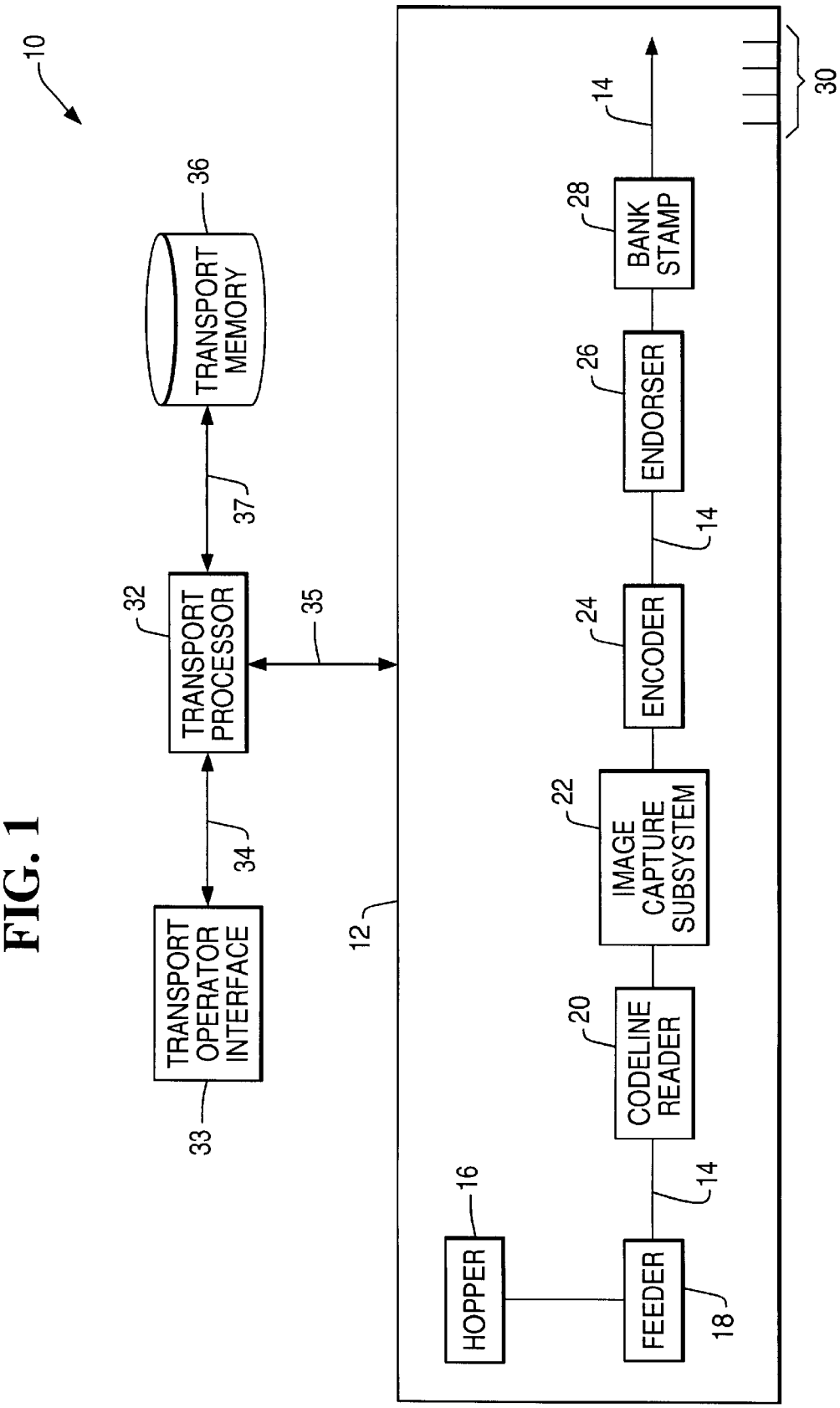
FIG. 1 is a schematic block representation of an image-based check processing system embodying the present invention.

The present invention is directed to a belt apparatus for use in a document processing system. The specific construction and use of the document processing system may vary. By way of example, a document processing system in the form of an image-based check processing system 10 is illustrated in FIG. 1. The check processing system 10 may be, for example, a sorting machine or a proof machine wherein financial document items such as checks are processed in a bank.

As shown in FIG. 1, the check processing system 10 includes a check processing transport 12 having a document track 14 along which financial document items, such as checks, can be transported from an upstream end to a downstream end. The transport 12 includes a number of different check processing modules lying along the document track 14 for performing specific document processing operations on document items moving along the document track. The transport 12 includes a hopper module 16 into which a stack of financial document items including checks are placed. A document feeder module 18 adjacent the hopper 16 selectively feeds or drives each document item from the stack of document items in the hopper to transport the document item from the upstream end to the downstream end along the document track 14 to sorting pockets of a pocket module 30 located at the end of the document track.

The check processing system 10 includes a codeline reader module 20 such as a MICR reader located along the document track 14. The MICR reader 20 reads a MICR codeline from each check being processed in a known manner. Alternatively, the codeline reader may be an OCR reader instead of a MICR reader depending upon the particular application. The check processing system 10 further includes an image capture subsystem module 22 located along the document track 14. The image capture subsystem 22 captures an image of each document item for a number of different purposes well known in the financial industry. More specifically, the image capture subsystem 22 includes an imaging camera (not shown) which is controlled to capture images of document items moving along the document track 14. An encoder module 24 encodes missing fields on each check. An endorser module 26 applies an endorsement in a known manner to each check. A bank stamp module 28 stamps each check to identify the bank institution processing the check. The structure and operation of MICR readers, OCR readers, imaging cameras, encoders, endorsers, and bank stamps are well known and, therefore, will not be described.

The check processing system 10 further includes a transport processor 32 and a transport operator interface 33 which communicates via signals on line 34 with the transport processor. The operator interface 33 may include a keyboard, a mouse, and a display, all of which communicate via signals with the transport processor 32. The transport processor 32 controls operation of the transport 12 via signals on line 35. Suitable processors and memories are readily available in the marketplace. Their structure and operation are well known and, therefore, will not be described.

The check processing system 10 also includes a transport memory 36 which communicates via signals on line 37 with the transport processor 32. It is contemplated that the memory 36 could be a single memory unit or a plurality of different memory units. An executable transport application program is stored in the memory 36. The transport application program is associated with a particular type of document processing work. For example, one type of work is proof of deposit. Another type of work is remittance processing. Still another type of work may be sorting of document items. When the transport application program is executed, the check processing modules lying along the document track 14 are controlled to process document items moving downstream along the document track in accordance with the transport application program, as is known. The memory 36 also stores sequence numbers, MICR codelines, image data, encoder status, endorsement status, and bank stamp status associated with document items which have been processed in accordance with the transport application program.

Each check processing module usually has a baseplate to which components associated with the check processing module are attached. These components may include a number of bearing assemblies and a number of drive belts drivingly coupled to the bearing assemblies. For purposes of describing the present invention, a typical baseplate of a check processing module having a baseplate is illustrated in FIGS. 2 and 3 and is designated with the reference numeral "40".

Figure 2:
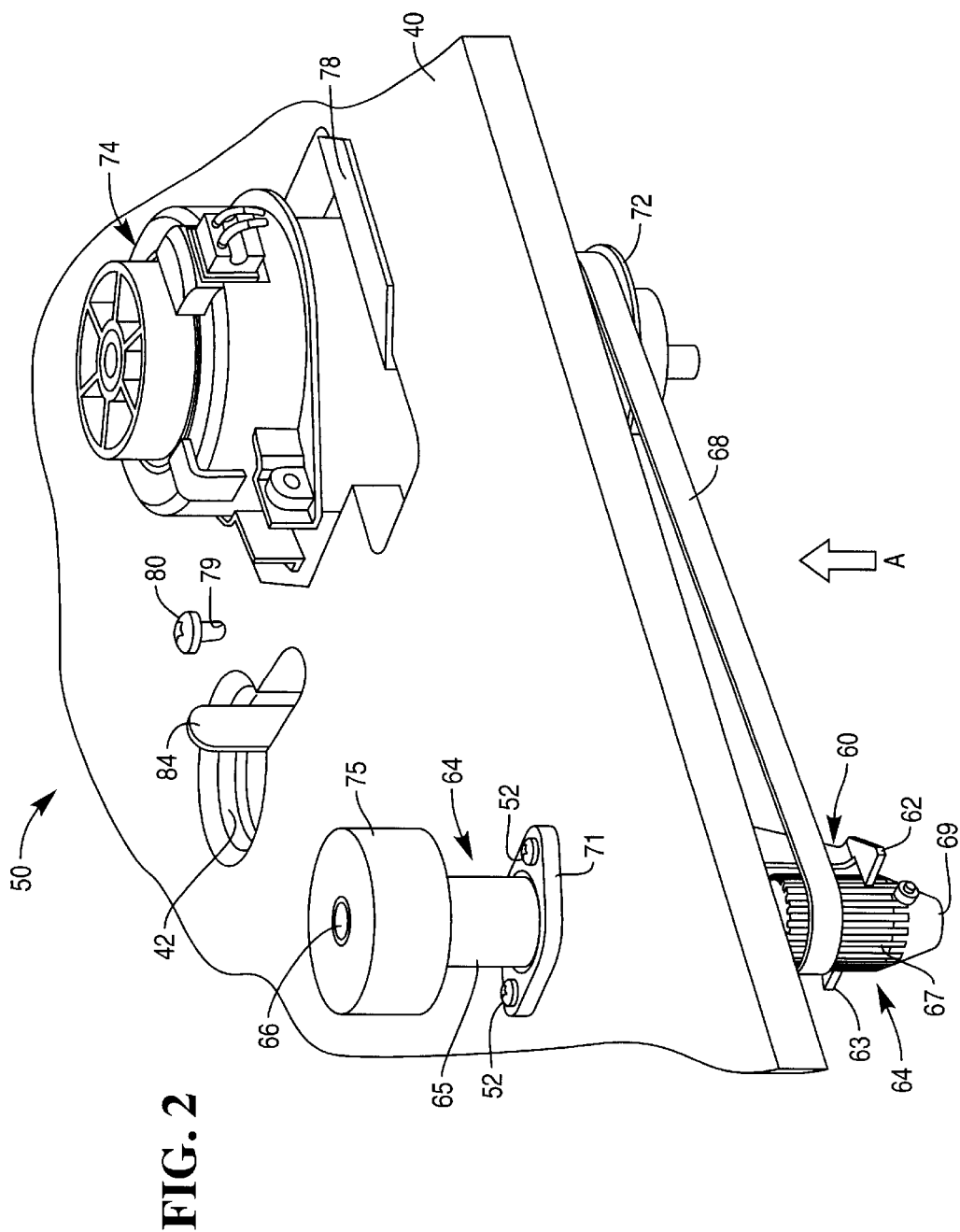
FIG. 2 is a perspective top view of a belt apparatus used in the image-based check processing system of FIG. 1.
Figure 3:
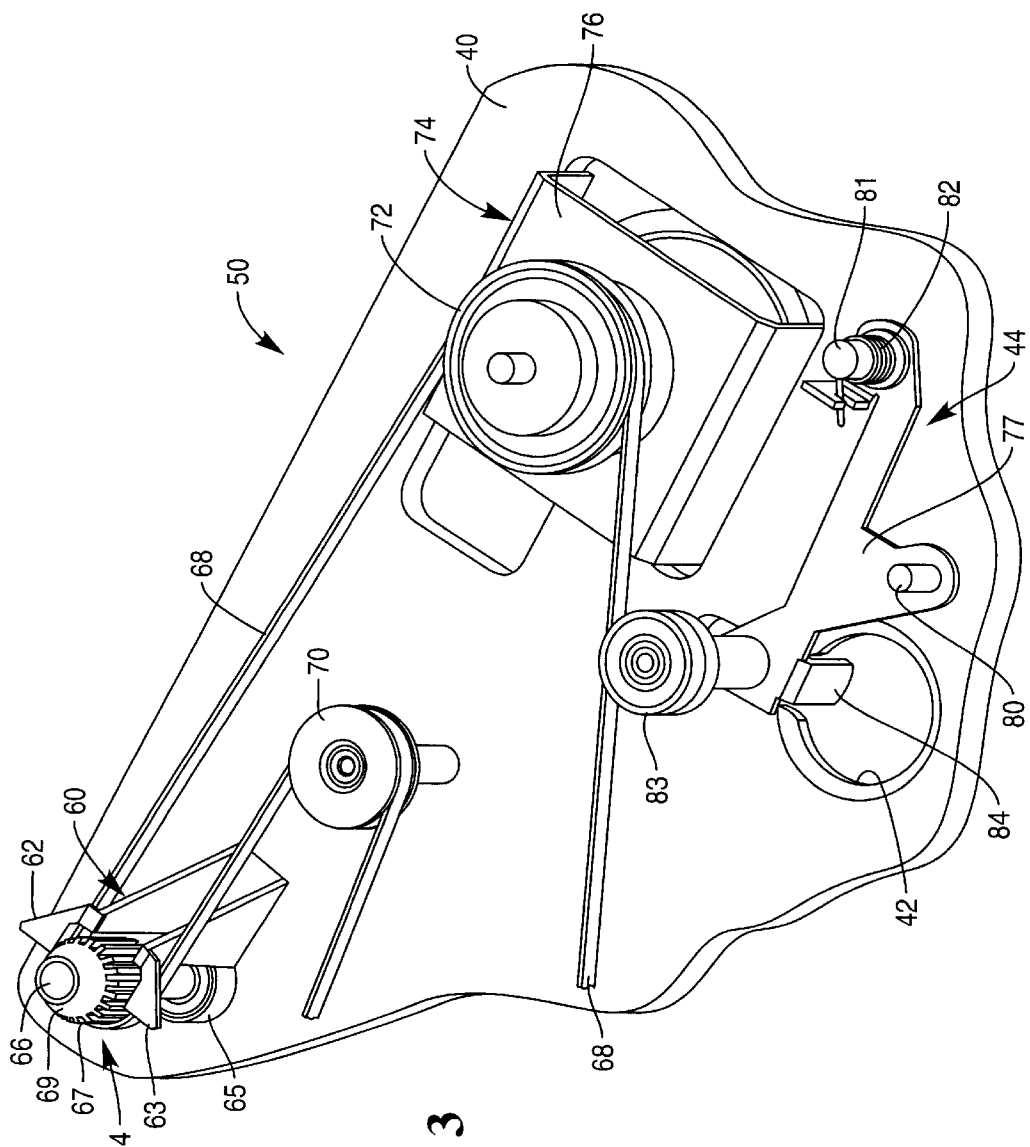
FIG. 3 is a perspective bottom view looking in the direction of arrow A in FIG. 2.

Referring to the top view of FIG. 2, a belt apparatus 50 constructed in accordance with the present invention is attached to the baseplate 40. A bottom view looking in the direction of arrow "A" of FIG. 2 is illustrated in FIG. 3. As best shown in FIG. 3, the belt apparatus 50 includes a substantially U-shaped bracket 60 which has a pair of transverse flanges 62, 63. Preferably, the pair of flanges 62, 63 extend in substantially opposite directions relative to each other and substantially parallel with the plane in which the baseplate 40 lies.

A number of bearing assemblies is disposed on top of the baseplate 40. For simplicity, only one bearing assembly 64 is shown in FIGS. 2 and 3. The bearing assembly 64 includes a bearing housing 65 (FIG. 3) having a number of ball bearings (not shown) contained therein. The bearing assembly 64 further includes a drive shaft 66 which extends through the bearing housing 65 and is supported for rotation about its longitudinal central axis by the ball bearings contained in the bearing housing 65. The bearing assembly 64 also includes a drive pulley 67 which is connected at one end of the drive shaft 66. The drive pulley 67 has a number of gear teeth as shown in FIGS. 2 and 3. The bearing housing 65 includes a flange portion 71 (FIG. 2) through which a pair of screws 52 secures the bearing housing 65 and, therefore, the bearing assembly 64 to the baseplate 40.

A drive wheel 75 is connected to one end of the drive shaft 66 of the bearing assembly 64. A drive belt 68 has gear teeth (not shown) which is drivingly coupled to the gear teeth of the drive pulley 67 which is connected to the other end of the drive shaft 66. The drive pulley 67 has a chamfered surface 69 which allowed the drive belt 68 and the drive pulley to easily slide onto each other when the drive belt and the drive pulley were initially installed. One end of the drive belt 68 extends around an idler pulley 70, and the other end of the drive belt 68 extends around a drive pulley 72 of a motor bracket assembly 74. The motor bracket assembly 74 includes a main bracket portion 76 (FIG. 3) to which the drive pulley 72 is operatively connected. The main bracket portion 76 is supported by a flange 78 (FIG. 2). The motor bracket assembly 74 has a motor which drives the drive pulley 72 in a known manner to drive the drive belt 68.

A belt tensioning mechanism 44 is disposed on the bottomside of the baseplate 40, as shown in FIG. 3. A pair of screws 80, 81 secures the mechanism 44 to the baseplate 40. The screw 80 is disposed in a slot 79 (FIG. 2) in the baseplate 40. The mechanism 44 further includes an arm bracket portion 77 (FIG. 3) having one end which is pivotally mounted about the screw 81. A torsion spring 82 is mounted on the screw 81 on the bottomside of the baseplate 40. The torsion spring 82 biases the arm bracket portion 77 about the screw 81 in the clockwise direction as viewed looking at FIG. 3. A tension pulley 83 is connected to the other end of the arm bracket portion 77 to maintain correct tension in the drive belt 68, as will be described in more detail later. A belt tensioner handle 84 is also connected to this other end of the arm bracket portion 77 and extends through an opening 42 in the baseplate 40. Accordingly, the handle 84 is accessible from above the baseplate 40.

Figure 4:
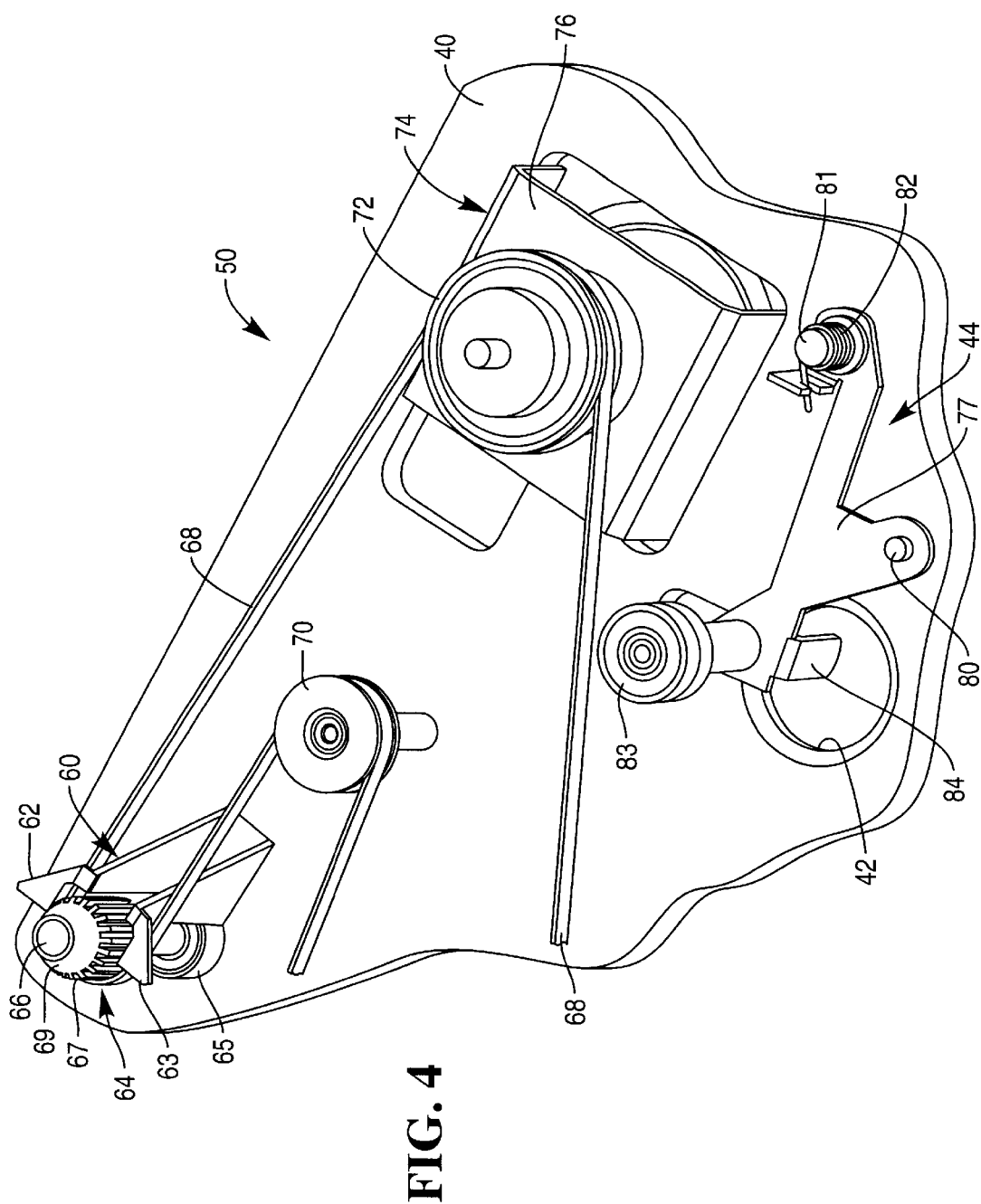
FIG. 4 is a perspective view similar to FIG. 3, and showing parts in different positions.
Figure 5:
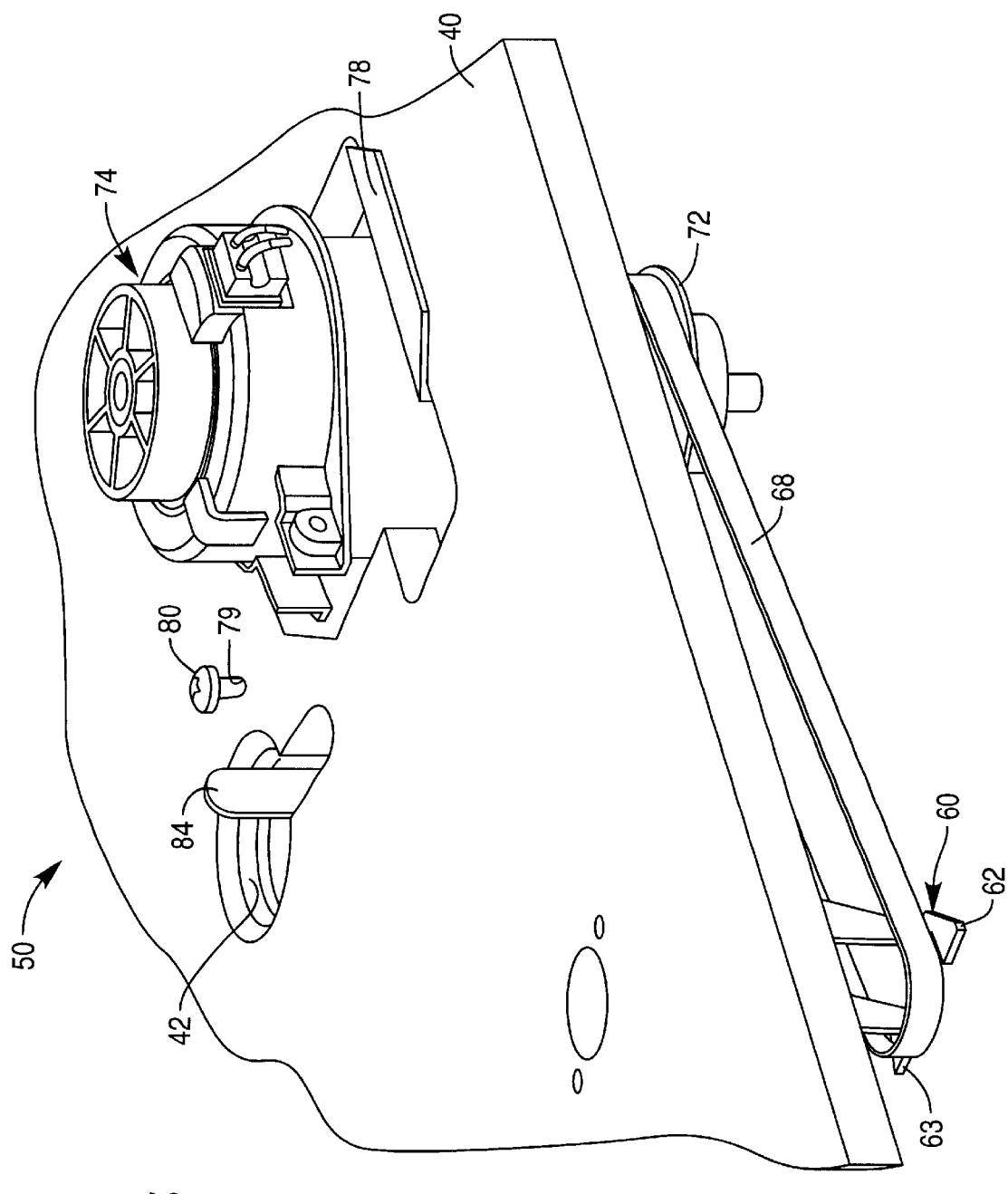
FIG. 5 is a perspective view similar to FIG. 2, and showing certain parts removed.

The bearing assembly 64 may need to be replaced from time to time. For example, the ball bearings contained within the bearing housing 65 may become worn. To replace the bearing assembly 64, a field-service operator first reduces tension in the drive belt 68 by loosening the screws 80, 81 and moving the handle 84 in the clockwise direction as viewed looking at FIG. 4. When the handle 84 is moved in the clockwise direction, the tension pulley 83 moves away from the drive belt 68, as shown in FIG. 4. The operator then unscrews and removes the pair of screws 52 to loosen the bearing assembly 64 from the baseplate 40. After the pair of screws 52 is removed, the bearing assembly 64 including the bearing housing 65, the drive shaft 66, and the drive pulley 67 are removed from above the baseplate 40. When the bearing assembly 64 is removed from above the baseplate 40, slack is formed in the drive belt 68 and the drive belt rests on the flanges 62, 63 of the bracket 60, as best shown in FIG. 5.

After the bearing assembly 64 is removed from the baseplate 40, a new bearing assembly is installed in its place. As the new bearing assembly is being installed, the gear teeth of the drive pulley of the new bearing assembly threads onto the gear teeth of the drive belt 68. After the drive belt 68 is thread onto the drive pulley of the new bearing assembly, the drive belt 68 is retensioned by using the belt tensioning mechanism 44. More specifically, the bias of the torsion spring 82 biases the tension pulley 83 against the drive belt 68 to provide the drive belt with the proper tension. The screws 80, 81 are then tightened to maintain the proper tension in the drive belt 68. Finally, the pair of screws 52 is screwed into the flange portion of the bearing housing of the new bearing assembly to secure the new bearing assembly to the baseplate 40.

A number of advantages result by providing the belt apparatus 50 in accordance with the present invention. One advantage is that the bearing assembly 64 can be quickly and easily removed from above the baseplate 40 without having to lift and pivot the baseplate 40 to gain access to the space below the baseplate. By supporting the drive belt 68 below the baseplate 40 when the bearing assembly 64 is removed and replaced with a new bearing assembly, the drive belt 68 can be easily coupled to the drive pulley of the replacement bearing assembly. This reduces the amount of time required for a field-service operator to remove the bearing assembly 64 and replace it with the new bearing assembly. Accordingly, costs are reduced.

Another advantage is that the need for a field-service operator to rethread the drive belt 68 around the other pulleys is eliminated or at least minimized. This need is eliminated because the drive belt 68 is held in place when the bearing assembly 64 is removed. By holding the drive belt 68 in place when the bearing assembly 64 is removed, the chance of the drive belt 68 falling off of the other pulleys is reduced. This is especially advantageous when the path of the drive belt 68 is relatively complex and it is difficult for the field-service operator to rethread the drive belt 68 back onto the pulleys in the correct orientation.

Still another advantage is that a field-service operator can easily adjust the tension on the drive belt 68 through the use of the belt tensioner mechanism 44. The use of the mechanism 44 makes it easier for a field-service operator to adjust tension in the drive belt 68 after the new bearing assembly has been installed.

Although the above description describes the bearing assembly 64 as comprising the bearing housing 64, the drive shaft 66, and the drive pulley 67, it is contemplated that the bearing assembly may include only one of these parts or any other combination of these parts.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A belt apparatus for use in a document processing system having a baseplate, and a removable bearing assembly connected to the baseplate and having a drive pulley to which a drive belt is drivingly coupled, the belt apparatus comprising:

a bracket coupled to the baseplate and for supporting the drive belt when the bearing assembly including the drive pulley is removed from the baseplate, the bracket comprising a substantially U-shaped bracket, the bracket including a pair of flanges on which the drive belt rests when the bearing assembly is removed from the baseplate, the pair of flanges extending in substantially opposite directions relative to each other and substantially parallel with the plane in which the baseplate lies.

2. A belt apparatus for use in a document processing system having a baseplate, a removable bearing assembly connected to the baseplate, and a drive belt drivingly coupled to the bearing assembly, the belt apparatus comprising:

means for supporting the drive belt when the bearing assembly is removed from the baseplate;

means for adjusting tension in the drive belt after the drive belt and a replacement bearing assembly have been coupled together;

the supporting means comprising a substantially U-shaped bracket;

the bracket including a pair of flanges on which the drive belt rests when the bearing assembly is removed from the baseplate; and the pair of flanges extending in substantially opposite directions relative to each other and substantially parallel with the plane in which the baseplate lies.

* * * * *